United States Patent [19]

Tanner

[11] Patent Number: 4,992,058
[45] Date of Patent: Feb. 12, 1991

[54] FLAT CABLE TRANSMISSION SYSTEM

[75] Inventor: Peter R. Tanner, Barking, England

[73] Assignee: Comfloor Limited, Barking, United Kingdom

[21] Appl. No.: 294,158

[22] PCT Filed: Jun. 19, 1987

[86] PCT No.: PCT/GB87/00432
§ 371 Date: Dec. 27, 1988
§ 102(e) Date: Dec. 27, 1988

[87] PCT Pub. No.: WO87/07985
PCT Pub. Date: Dec. 30, 1987

[30] Foreign Application Priority Data
Jun. 19, 1986 [GB] United Kingdom ............... 8615004

[51] Int. Cl.$^5$ ............................................. H01R 25/16
[52] U.S. Cl. ................... 439/211; 174/72 R; 439/498

[58] Field of Search .......................... 174/72 R, 72 A; 439/207, 209, 211, 216, 492, 494, 498, 499, 676

[56] References Cited
U.S. PATENT DOCUMENTS
4,181,395 1/1980 Grabowski ........................ 439/499

Primary Examiner—Eugene F. Desmond
Attorney, Agent, or Firm—Rosenblum, Parish & Bacigalupi

[57] ABSTRACT

For the communications and data transfer wiring of a modern office building the invention provides a pre-wired cable trunking module with a number of socket outlets along its top surface. The module has a flat cable extending through the duct, sets of wires being split off the cable at intervals to connect with the outlets. Successive modules can have a single continuous cable extending through them, or can be connected by multi-way connectors at each end of each module.

14 Claims, 4 Drawing Sheets

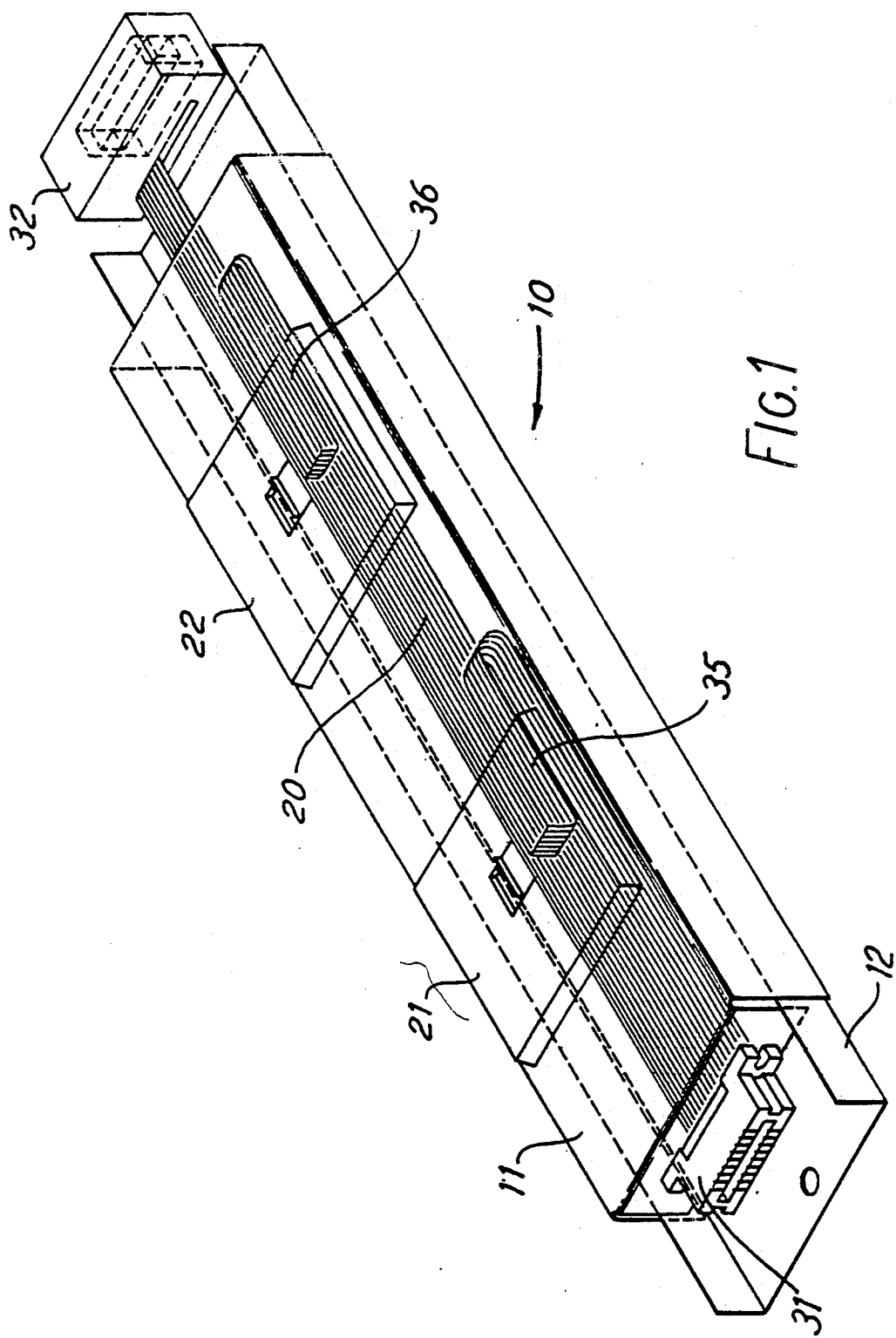

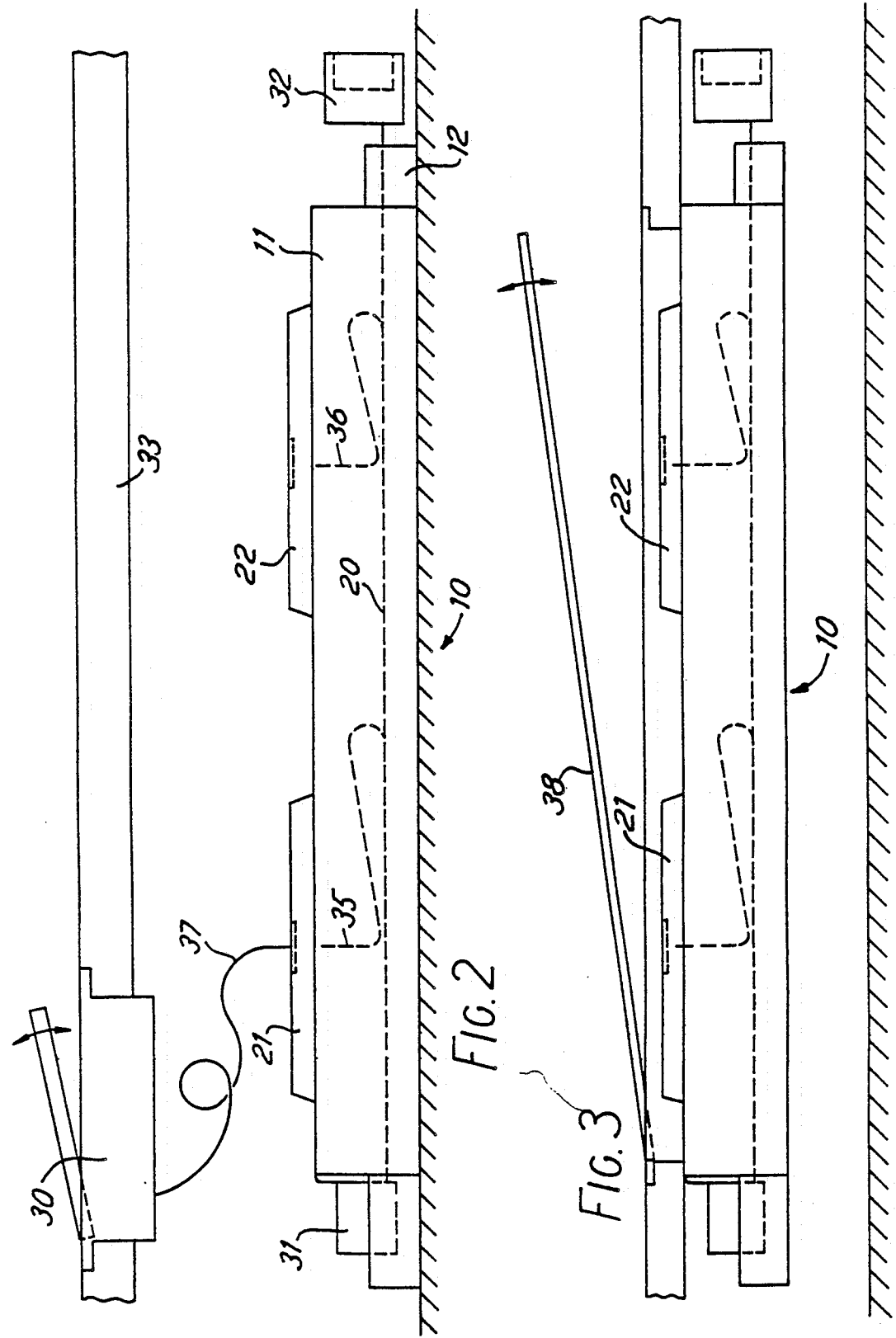

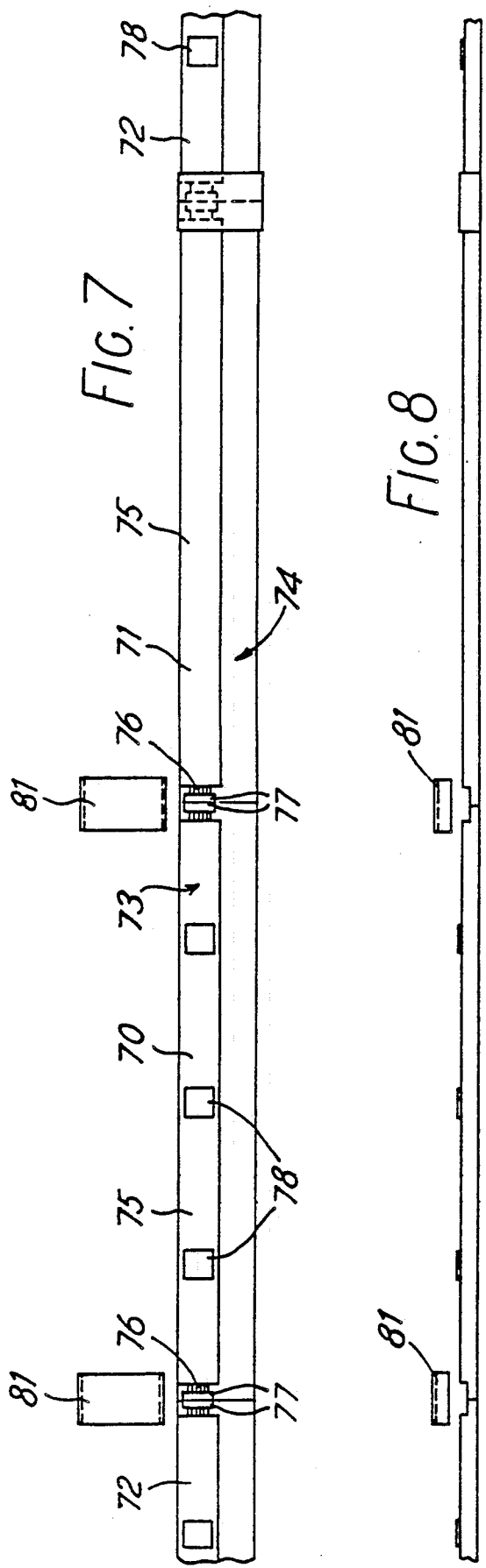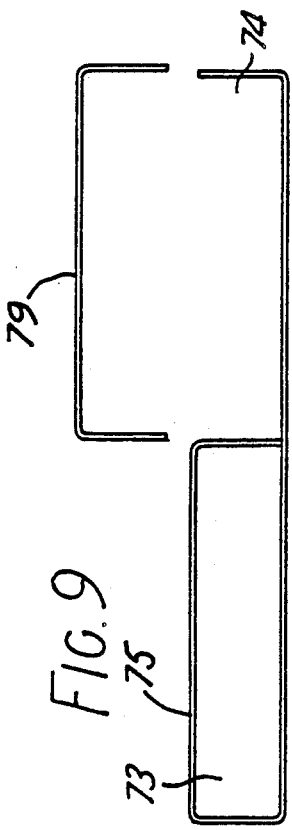

FLAT CABLE TRANSMISSION SYSTEM

The present invention relates to a flat cable transmission system and, more particularly, to a system in which a flat cable is contained within trunking which extends, for example, under a raised access floor.

Fixed pitch flat or ribbon cables are widely available for telecommunication and data transmission applications. Typically, these flat cables are employed to interconnect discrete items of data processing equipment, e.g., a VDU screen to a printer, but are also used under the carpet in open plan offices to facilitate telephone interconnections to and between employees.

The above applications have the disadvantages that, as the number of items of equipment increases, the cables can become obtrusive, thus detracting from the appearance of the office, and can become tangled, thus making rearrangement of the connections a difficult task.

The present invention seeks to overcome or reduce one or more of the above disadvantages, and to extend the use of flat cables to raised access floor (or false floor) applications in such a way as to permit easy and rapid installation or rearrangement.

Conventionally the installation of a flat cable of 50 ways (say) both commences and finishes with 50 ways being available. Connections to any particular way or ways along the length of the flat cable are effected by a connector that permits another discrete length of flat cable to spur or 'T' from the main flat cable. The present invention seeks to provide an alternative method of effecting the connections which requires fewer components and is more economic in terms of both cost and time.

According to the present invention there is provided a multiconductor flat cable trunking module comprising means defining an elongate duct a flat cable having a plurality of conductors and extending within and along the length of said duct, linking means at each end of said cable, a plurality of socket outlets at intervals along a surface of the duct, and intermediate connections within the duct from said cable to said socket outlets which are formed by a number out of said plurality of conductors which form part of the flat cable along a first part of the length thereof, but which are separated from the remaining conductors along a second part of the length thereof.

In a preferred development, a multiconductor flat cable underfloor trunking system comprises a plurality of trunking modules arranged to be located one after the other beneath a raised access floor, a respective multiconductor flat cable extending within and along the length of each module with multiway connectors electrically connected to each end of the cable to effect electrical interconnections between the ends of adjacent modules.

The socket outlets may then appear flush in the floor surface, or the whole trunking system may lie in the floor void with intermediate connectors between said socket outlets and further socket outlets set in the floor surface.

Preferred embodiments of the present invention will now be described, by way of example only, with reference to the accompanying drawings, of which:

FIG. 1 shows a top perspective view of a trunking module of a flat cable transmission system in accordance with the present invention;

FIG. 2 shows a side view of the module of FIG. 1 installed in the void of a raised access floor;

FIG. 3 shows a side view of the module of FIG. 1 with its top surface level with a raised access floor.

FIG. 7 shows a number of cable trunking modules according to the invention in plan view;

FIG. 8 shows a side view of the module in FIG. 7;

FIG. 9 shows a cross-section of a first form of trunking; and

FIG. 10 shows a second form.

Figure 4:
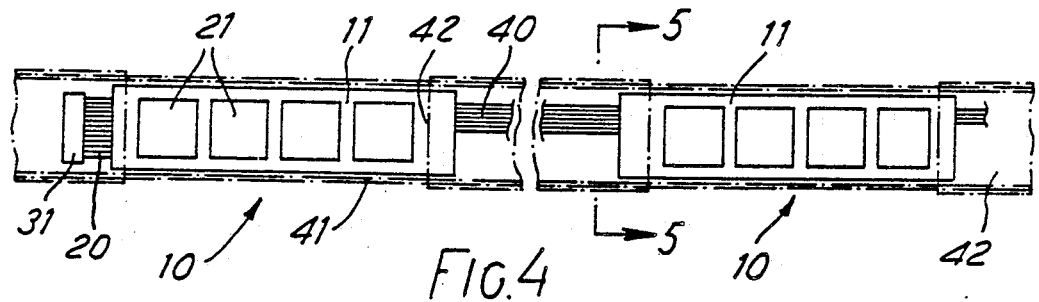
FIG. 4 shows a trunking system according to the invention installed in a duct.

Referring to the drawings, there is shown a trunking module 10 comprising too and bottom channel members 11 and 12 of thin gauge zinc plated mild steel which define a rectangular duct which contains a fixed pitch multiconductor flat ribbon cable 20. In the module shown a 50-way flat cable is employed. Apertures (not shown) in the top channel member 11 each permit the mounting of a standard telephone socket outlet accessory 21, 22. Extended ends of channel 20 can be mechanically linked (see FIG. 8).

At one end of the cable 20 is fitted a connector 31 to be used to join to the multicore incoming telecommunication cable, often via a local junction box (not shown). At the other end of the cable there is fitted a connector 32 for connection to the next module of the transmission system.

At the incoming end, i.e. the left hand end in the Figures, of the module, the cable has 50 ways (i.e. 50 conductors). However, a bunch of six conductors is separated from the rest along a length of cable 20 which extends from the right hand end back to a position at or adjacent to the telephone accessory socket 21. This separation is effected by cutting the insulation between the sixth and seventh conductors during assembly of the module in the factory. The end of the 6-way cable 35 so produced is then trimmed to a suitable length and prepared, e.g. by separating the individual conductors, for electrical connections to be made to six terminals of the socket 21. Thus between sockets 21 and 22 the cable has only 44 ways.

Six further ways are also separated from the rest of cable 20 to similarly form a 6-way cable 36 which is connected to socket 22. Thus cable 20 has only 38 ways connected to output connector 32 for connection to the next module (not shown) of the transmission system.

In use a plurality of modules 10 are positioned end to end. The input to the next module will have only 38 ways so that connector 32 and the input connector to the next module can be 38-way connectors. In practice, the connectors are usually only available in a limited number of standard sizes so that, for example, a 40-way connector can be used with two ways being redundant. Even smaller connectors can be used in modules further along the trunking.

In the example shown, cable 20 can supply four modules each having two sockets with six terminals, and there will be two ways spare at the output of the fourth module. If further sockets are required one or more further cables may extend along the interior of the duct or an adjacent duct as required.

Installation of these telecommunication modules in the void characteristic of raised access floors will afford a convenience and flexibility to an occupier by the ease with which alterations to the distribution of office telephones can be effected In the embodiment of FIG. 2, interconnections between service outlet boxes 30 mounted in raised access floor panels 33, and the telecommunication modules 10 installed beneath those panels are achieved by pluggable cord connectors 37 that plug in the telecommunication socket outlets. These connectors being flexible, permit floor panels incorporating service outlet boxes to be moved to new locations without the need for qualified engineers to attend such operations.

With the use of suitable corner joints the module can be arranged to negotiate corners, with the flat cable(s) being folded as necessary.

An advantage of the above-described arrangement is that it provides a quick and easy method of effecting connections to a multi-conductor flat ribbon cable. It extends the use of such cables to raised access floor applications by incorporating the flat cables in factory-assembled modules affording telephone sockets at intervals along the module length ready-wired for rapid installation during refurbishment or new building operations. The need to introduce a spur cable from the main flat cable is avoided by segregating the necessary number of ways from the main flat cable and routing these segregated ways direct to the appropriate terminal connections. Since all such connections are effected in the factory, installation on site is greatly facilitated. In particular the need to employ connectors and discrete lengths of flat cable at intermediate positions along the main flat cable, to facilitate connections to the accessories, is avoided.

Since the number of ways decreases along the trunking, connectors having a smaller number of ways can be employed which has the advantage of further reducing costs. In conventional "spur" systems, it is necessary to use connectors having the full number of ways throughout.

Various modifications may be made to the above described arrangement. The number of ways in the flat cable and the number of ways taken off at each socket can be varied as desired. In particular for a V.D.U. and printer combinations it may be necessary to take off up to 25 ways at a single accessory socket.

In the modification of FIG. 3, the trunking is installed with its top surface substantially level with the floor. In this case, telephone appliances can be plugged directly into the socket outlets 21, 22 mounted along the module 10 by raising a hinged access cover 38 incorporated with the service outlet frame.

In a further modification, not shown, the trunking is installed above a conventional floor, preferably around the periphery thereof.

The flat cables may convey telephone or other communication signals, or computer or other data signals. The present invention relates broadly to factory-assembled modules for transmission systems and embraces cables employing fibre optic techniques.

Figure 5:
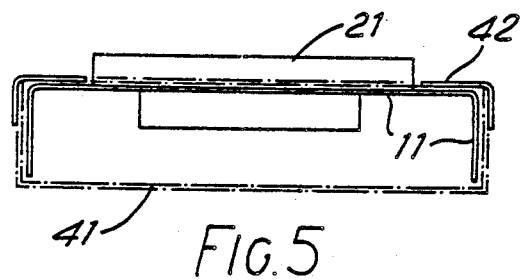
FIG. 5 shows a cross-section on line 5—5 in FIG. 4.

FIGS. 4 and 5 show how to use modules as described to provide a complete underfloor trunking system. This embodiment uses a flat cable having a plurality of conductors extending continuously through a plurality of trunking modules which each comprise a length of duct and have one or more electrical outlets. Such a system can be produced in a factory to any desired configuration. Preferably, the module will have an inverted U-shaped duct with the outlet(s) in the middle surface. An underfloor system can be produced by laying the whole trunking system of modules and intermediate lengths of cable along a conventional open U-shaped duct with the electrical outlets of the modules facing upwards.

FIG. 4 shows two modules 10, each with four telephone outlets 21. Each outlet requires four conductors off the cable 20, so that the cable is reduced by sixteen conductors at each module. Of course, different numbers of outlets and conductors may be appropriate, depending upon the application.

The modules 10 with lengths of continuous intermediate cable 40 are positioned with the outlets 21 facing upwards within a length of conventional ducting, of which channel 41 may be only one of a number of parallel channels. The cable 40 between modules may vary between for example one and eight meters. Each module 10 may have a length of 0.5 m for example. When in position, shorter lengths of cover 42 are placed over the channel 41 to cover the cable 40 but leaving the outlets 21 exposed. FIG. 5 illustrates the installed system in cross-section.

As many modules are used as are needed, until all or most of the conductors are used up. The outlets are not necessarily telephone sockets, but are appropriate to the need. The complete system may be installed with the modules fixed directly to the underneath of the floor itself, and the outlets 21 directly accessible through apertures in the floor, liftable covers being provided for the apertures. Alternatively, flexible leads may be used to connect from a system lying within a floor void to the socket outlets set into the floor. A suitable connector device is described below with reference to FIG. 6.

This connector device comprises a housing member, for mechanical connection to a module which incorporates an electrical outlet, a flexible tube fixed in a wall of the housing member and having means at its other end for physical connection to the rear of a socket outlet or its housing, and within the tube an electrical lead which is longer than the flexible tube and which has an electrical connector on that end which emerges in the housing member. With the housing member connected over an electrical outlet of the module, and the other end of the tube fixed to the distant socket outlet, the electrical lead cannot be subjected to any mechanical stress.

Figure 6:
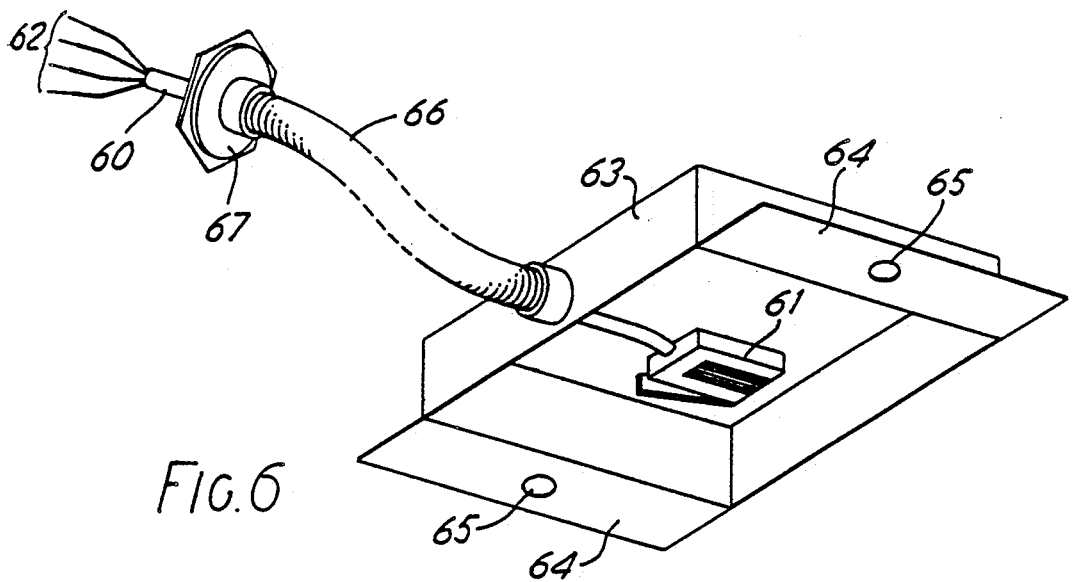
FIG. 6 shows a connector device for use in conjunction with a trunking system.

In FIG. 6, an electrical connection lead 60 has a standard telephone connector 61 at one end and bared wires 62 at the other. A rectangular housing member 63 has flanges 64 with holes 65 by means of which it can be secured using screws to the top surface of a module 10 as in FIG. 1. The housing member 63 is large enough to completely cover a socket outlet accessory 21 when the connector 61 is plugged in to the accessory.

A flexible metal tube 66 is fixed in the side wall of the housing member 63 and at its other end has a collar or gland fitting 67 for connection to the back of a socket outlet or a housing thereof (not shown). The wires 62 are connected electrically to the back of the outlet and the fitting 67 then used to anchor the tube 66 in place. The lead 60 is longer than the tube 66, so that any strain caused by trying to pull the socket outlet away from the module is taken by the tube 66. There is no danger of electrical disconnection of either end of the lead 60.

For ease of installation on site, a plug may also be fixed on the wires 62 at the other end of the lead 60, and a corresponding socket be provided on the rear of the socket outlet. Rather than holes 65, the housing member 63 may be circular have some form of quick release connection e.g. a bayonet connection, for securing it to the module.

It should also be noted that the application of such a connector device is not confined to the presently described underfloor module system. Such a connector device for protecting a connection lead may be used in other circumstances, for example for mains power leads.

A further advantageous form of trunking to be used as the basis for a module as previously described is described in FIGS. 7 to 10.

These show a cable trunking module having at least two parallel channels one of which is a duct permanently closed along its length and another of which is open, or closed only by a removable panel. The duct has one or more cables extending through it with connection devices at each end for linking to the cables of other such modules. The duct may or may not have in its wall one or more outlets permanently wired to the cable(s).

As seen in FIG. 7, two complete cable trunking modules 70, 71 and two part modules 72 are shown. Each module has two parallel channels 73, 74, and is approximately 17.5 cms wide and 200 cms long.

Channel 73 is in each case permanently closed along its length by a cover 75, while channel 74 is open, although it may be closed if required by a cover (79 in FIG. 9 or 10) which for example clips on or is screwed in place. Generally, the channels are fabricated of sheet metal, and the cover 75 of channel 73 is normally spot welded in place possibly after the installation of cables.

Module 71 is factory produced with a continuous cable or cables 76, for example a multi-channel ribbon, having a terminating connector 77 at each end. Module 70 also has a cable 76 extending through it, with connectors 77, but differs in having three socket outlets 78 in the cover 75, the channel including within it connections between the cable or cables 76 and the outlets. The method of connection is as described in connection with FIG. 1.

A cable distribution system is made up as shown in FIGS. 7 and 8. Cable trunking modules are positioned end-to-end and connectors 77 are linked together to render the cable or cables 76 continuous. Modules 71 with no socket outlets are used as often as necessary to link up cables which extend through areas of a building which do not need any outlets. Small cover plates 81 may be used to cover the joins between the modules and to protect the connectors 77. The ends of the modules and the plates 81 may if desired be angled to allow the modules to lie at an angle to each other.

Once positioned, the modules provide a continuous open channel 74 alongside channel 73. This open channel can then receive any other cables, ribbon cables, optical cables which require protection or screening but which do not need such frequent outlets. Outlets can be provided wherever required by manual installation on-site. A removable cover 79 can then be placed over the channel between the outlets if necessary.

The distribution system described is particularly suitable for installation in the void below a 'raised access' floor system, but is not confined to this use.

FIGS. 9 and 10 show possible cross-sections for the trunking as examples . It is also possible to have more than one closed channel and more than one open channel in each module if the quantity of cabling, or the screening necessary between cables, dictates this. The trunking may be made in any suitable material, including metal or plastics.

I claim:

1. A multiconductor flat cable trunking module comprising means defining an elongate duct, a flat cable having a plurality of conductors and extending within and along the length of said duct, linking means at each end of said duct, a plurality of socket outlets at intervals along a surface of the duct, and intermediate connections within the duct from said cable to said socket outlets which are formed by a number out of said plurality of conductors which form part of the flat cable along a first part of the length thereof, but which are separated from the remaining conductors along a second part of the length thereof.

2. A trunking module as claimed in claim 1, wherein said linking means comprise an integral continuation of said cable at the end of the module.

3. A trunking module as claimed in claim 1, wherein said means for linking comprise electrical connectors on each end of said cable.

4. A trunking module as claimed in any preceding claim, wherein the duct is closed along its length with no direct access to said cable.

5. A trunking module as claimed in claim 1, wherein adjacent each socket outlet is physical engagement means for a connector device.

6. A trunking module as claimed in claim 1, wherein the socket outlets include a telecommunications jack socket.

7. A trunking module as claimed in claim 1, wherein said means defining an elongate duct has at least two parallel channels, one of which is a duct permanently closed along its length and another of which has a side closed only by a removable panel.

8. A trunking module as claimed in claim 1, wherein said means defining an elongate duct has at least two parallel channels, one of which is a duct permanently closed along its length and another of which has an open side, the socket outlets being in the closed duct.

9. A trunking module as claimed in claim 8, wherein the surface of the closed duct containing the socket outlets is parallel to the open side of the other duct.

10. A trunking module as claimed in claim 8 or 9, wherein further socket outlets are fixed over said open side.

11. A cable trunking system including a plurality of trunking modules each comprising means defining an elongate duct, a flat cable having a plurality of conductors and extending within and along the length of said duct, linking means at each end of said duct, a plurality of socket outlets at intervals along a surface of the duct, and intermediate connections within the duct from said cable to said socket outlets which are formed by a number out of said plurality of conductors which form part of the flat cable along the first part of the length thereof, but which are separated from the remaining conductors along a second part of the length thereof, said plurality of trunking modules being connected together via interconnection of said linking means.

12. A trunking system as claimed in claim 11, wherein said plurality of elongate ducts of successive modules are serially connected end to end.

13. A trunking system as claimed in claim 11, which includes intermediate ducts which enclose said flat cable, which intermediate ducts have no socket outlets and are physically connected to the elongated ducts.

14. A trunking system as claimed in claim 12 or 11, which includes intermediate ducts which enclose said linking means between said flat cable, which intermediate ducts have no socket outlets and are physically connected in-between the elongate ducts.

* * * * *